United States Patent
Takagi

[19]
[11] Patent Number: 6,095,009
[45] Date of Patent: Aug. 1, 2000

[54] BALL SCREW HAVING SPACERS

[75] Inventor: Hiroyuki Takagi, Hirakata, Japan

[73] Assignee: Tsubaki Nakashima Co., Ltd., Hyogo-ken, Japan

[21] Appl. No.: 09/276,503

[22] Filed: Mar. 25, 1999

[30] Foreign Application Priority Data

Oct. 27, 1998 [JP] Japan ................. 10-321411

[51] Int. Cl.[7] ......................................... F16H 55/17
[52] U.S. Cl. ................................................. 74/459
[58] Field of Search ................... 74/459, 424–8 NA; 384/520

[56] References Cited

U.S. PATENT DOCUMENTS

| | | | |
|---|---|---|---|
| 4,277,117 | 7/1981 | George | 384/520 |
| 5,356,227 | 10/1994 | Sibley et al. | 384/520 |
| 5,927,858 | 7/1999 | Agari | 384/520 |

FOREIGN PATENT DOCUMENTS 3455 of 1972 Japan .
25480 of 1981 Japan .
169746 of 1998 Japan .

*Primary Examiner*—Dirk Wright
*Attorney, Agent, or Firm*—Howson & Howson

[57] ABSTRACT

In order to provide a ball screw, ball, which allows to reduce the ball's noise and prevent wearing and clogging of ball s without decreasing its loading capacity, without using a ball chain or spacer balls, a cylindrical spacer 20 is disposed at each area between adjacent balls 10. The spacer 20 includes, at the both axial ends thereof, concave surfaces 22, 22, each of which is complementary to the spherical surface of the ball 10, and a crater-like oil pocket P is formed on the concave surfaces 22, 22 in order to retain a lubricant such as grease.

The ball 10 slides in contact with the concave surfaces 22, 22. At that time, the lubricant reduces the friction of the ball 10, while the lubricant is transferred on the ball 10 and distributed over the ball circulation passage thoroughly.

6 Claims, 3 Drawing Sheets

BALL SCREW HAVING SPACERS

TECHNICAL FIELD

The present invention relates to the art of ball screws having a plurality of balls which are interposed between a screw shaft and a ball nut.

BACKGROUND ART

Ball screws are classified into several types depending on the ball circulation systems as follows: the end cap type, the return tube type, the circulation piece type, and the guide plate type.

Here, an end cap type ball screw will be described with reference to FIG. 5 showing an axial longitudinal sectional view thereof.

The end cap type ball screw 30 comprises a screw shaft 40 including a helical groove 42 in the outer peripheral surface thereof, a ball nut 50 including in the inner peripheral surface thereof a helical groove 52 opposed to the helical groove 42 of the screw shaft 40 and including therein a ball return passage 54 consisting of a through hole extending axially.

The ball nut 50 has a pair of end caps 60, 60 each of which is mounted to a respective axial end, and thereby the helical groove 42 of the screw thread 40, the helical groove 52 of the ball nut 50, and the ball return passage 54 are connected to define a ball circulation passage 58.

With the ball screw 30, balls 10 disposed within the ball circulation passage 58 collide with and rub against each other when they move rotationally, therefore an undesirable noise (generally, represented by "sound pressure levels") is produced during use of the ball screw 30, and balls 10 wear out because of the friction therebetween.

Further, since the balls 10 are jostling with each other while in use, the balls 10 are hard to roll to cause a locking phenomenon, which may result in clogging of the balls, especially when the ball screw 30 is used while being subjected to preload.

As a consequence, there is proposed a ball screw wherein a so-called "spacer ball" is interposed between bearing balls in order to prevent the ball clogging.

As the spacer ball is designed to have a diameter slightly smaller than that of the bearing ball, the spacer ball is not required to bear the load. Thus, the ball screw is adapted to rotationally move while rolling the bearing balls and the spacer balls in the reverse direction to each other, thereby adjacent balls are prevented from rolling in the same direction and from jostling with each other.

As is disclosed in Japanese Unexamined Patent Publication No. 169746/1998, there is proposed a ball screw employing a so-called "ball chain" in which each of balls is incorporated into a connecting member so as to be held therein, and surrounded by a belt-like member so as not to fall from the connecting member.

A ball screw employing such a ball chain can avoid contact between balls within the circulation passage, reduce the wear of the balls, and prevent the occurrence of noise and ball clogging.

However, the ball screw using the aforementioned spacer balls includes therein bearing balls and spacer balls which are arranged in an alternate manner, and adjacent balls remain in contact. As a result, this ball screw involves the problem that the early wear, the occurrence of noise, and the expansion and contraction caused by the frictional heat are hard to control.

In addition, even for the ball screw employing such a spacer ball, it is necessary, in order to prevent the balls from clogging, to reduce the number of balls by two to four from a predetermined number of balls to be installed. Consequently, such a ball screw is accompanied with the problems that the bearing capacity thereof decreases correspondingly to the number of the reduced load-bearing balls and that the bearing capacity also decreases for the above-mentioned reason due to using the spacer balls.

Further, when a ball screw using spacer balls is preloaded, variation of the driving torque (which is referred to as "dynamic preload torque") of the ball screw increases and therefore smooth driving cannot be obtained.

Still further, when the ball screw is brought into repetitive operations with minute feeds, the ball clogging phenomenon occurs due to the mutual friction between balls even if the spacer balls are used.

Besides, when a ball chain is used, a concave channel must be formed in an interior wall for receiving the connecting member of the ball chain, and therefore an additional manufacturing cost is required.

Additionally, for a current mass-produced ball chain, the overall length thereof is predetermined according to its model number and this length cannot be changed appropriately, and therefore it is required to form a ball circulation passage with high dimensional accuracy so as to meet the predetermined length of the ball chain.

In fact, however, it is difficult to make uniform the overall lengths of the ball circulation passage and the ball chain. If the overall length of the ball chain is shorter than that of the ball circulation passage, then a gap is formed between the passage and the starting and terminal ends of the ball chain. On the other hand, if the overall length of the ball chain is longer than that of the ball circulation passage, the problem is caused that the ball chain cannot be installed within the ball circulation passage.

DISCLOSURE OF THE INVENTION

In accordance with the present invention, the aforementioned problems can be solved by a ball screw, comprising: a screw shaft including a helical groove in the outer peripheral surface thereof; and a ball nut including in the inner peripheral surface thereof another helical groove opposed to the groove of the screw shaft and including therein a ball return passage consisting of a through hole extending axially; and a plurality of balls which are interposed between the first helical groove of the screw shaft and the second helical groove of the ball nut and installed within the ball return passage, wherein spacers each of which has a concave surface complementary to the spherical surface of the ball at each end thereof is disposed at each area between the adjacent balls, and the spacers are not interconnected to each other.

In accordance with the present invention, since each of the spacers is disposed at each area between adjacent balls and the balls do not contact each other, the wearing and ball clogging caused by interconnection of the balls are prevented and the noise during servicing may be reduced.

In addition, since the spacers are not connected to each other but independent of each other, additional processing to the ball circulation passage such as in the case of a ball chain is unnecessary. Still further, strict control of manufacturing errors becomes unnecessary and a flexible support to each product becomes possible.

EMBODIMENTS

Figure 1A:
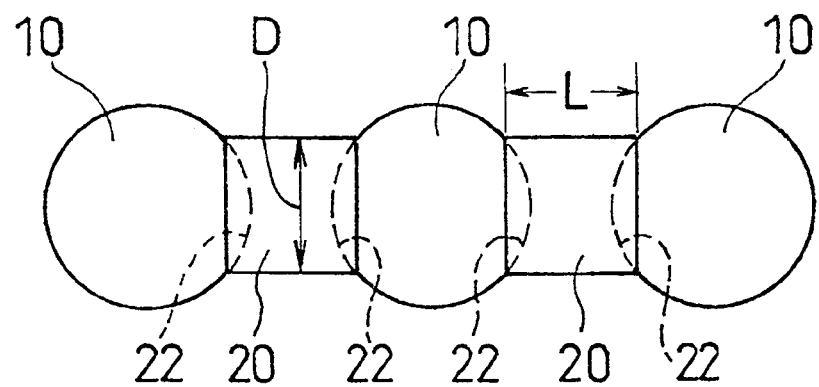
FIG. 1(a) is an enlarged side view showing a ball screw according to a first embodiment of the present invention, illustrating balls and spacers both of which are installed within a ball circulation passage.

Referring to FIG. 1, a ball screw of the present invention is shown with balls and spacers being installed in a ball circulation passage, and FIG. 1(a) is an enlarged side view.

A ball screw of the present invention has a configuration which is essentially similar to that of a conventional one with respect to a screw shaft and a ball nut but exclusive of a ball and a space, both to be described later, so the description and illustration of the entire configuration thereof are omitted here.

This ball screw has a cylindrical spacer 20 disposed at each area between adjacent balls 10, which is made of a metal, a synthetic resin (i.e., plastic), or the like.

The spacer 20 includes concave surfaces 22, 22 complementary to the spherical surface of the ball 10 at the both axial end faces thereof, and the concave surfaces 22, 22 is disposed so as to face the adjacent balls 10, 10 for slidably receiving the balls 10, 10.

Thus the ball 10 is maintained in slidable contact with the concave surface 22 of the spacer 20, and therefore the movement of the ball 10 is not interfered during its rolling within the ball circulation passage, and the ball 10 is precluded from the detachment from the concave surface 22 of the spacer 20 even if the ball 10 moves through a bending portion of the ball return passage, by appropriately determining the diameter D and length L of the spacer 20.

Figure 1B:
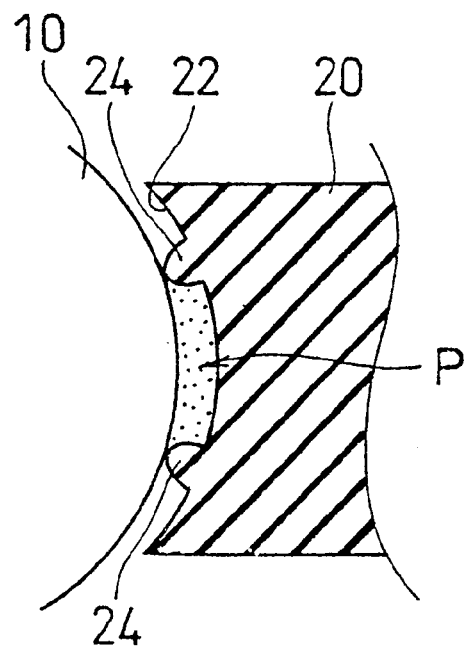
FIG. 1(b) is a partial sectional view, on a further enlarged scale, of a portion of FIG. 1(a)

FIG. 1(b) is a partial longitudinal sectional view of a part of FIG. 1(a).

The concave surface 22 which is formed in either opposite axial end of this spacer 20 provides a concave complementary to the spherical surface of the ball in its entirety, however, the concave surface 22 has an annular convex portion 24 formed thereon in order to define a crater-like oil pocket P.

When a lubricant such as grease is filled in the oil pocket P, the friction between the ball 10 and the concave surface 22 associated with sliding is decreased and the lubricant is transferred on the surface of the ball and distributed over the ball circulation passage thoroughly.

Figure 2:
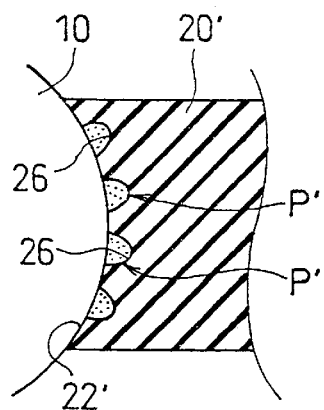
FIG. 2 is an enlarged partial sectional view of a ball and a spacer of a ball screw according to a second embodiment of the present invention.

Next, FIG. 2 shows an enlarged partial sectional view of a ball screw according to a second embodiment of the present invention showing another embodiment corresponding to FIG. 1(b).

The spacer 20' of this embodiment comprises a concave surface 22' at each axial end thereof which provides a concave complementary to the spherical surface of a ball 10 in its entirety, and a plurality of relatively small recesses 26 formed in the concave surface 22' so that the recesses 26 can serve as oil pockets P'.

The operations and effects thereof are the same as those of the embodiment shown in FIG. 1(b).

For the embodiment mentioned above, the diameter D of the spacers 20, 20' is preferably about 60% to 80% of the diameter of the ball 10.

Figure 3:
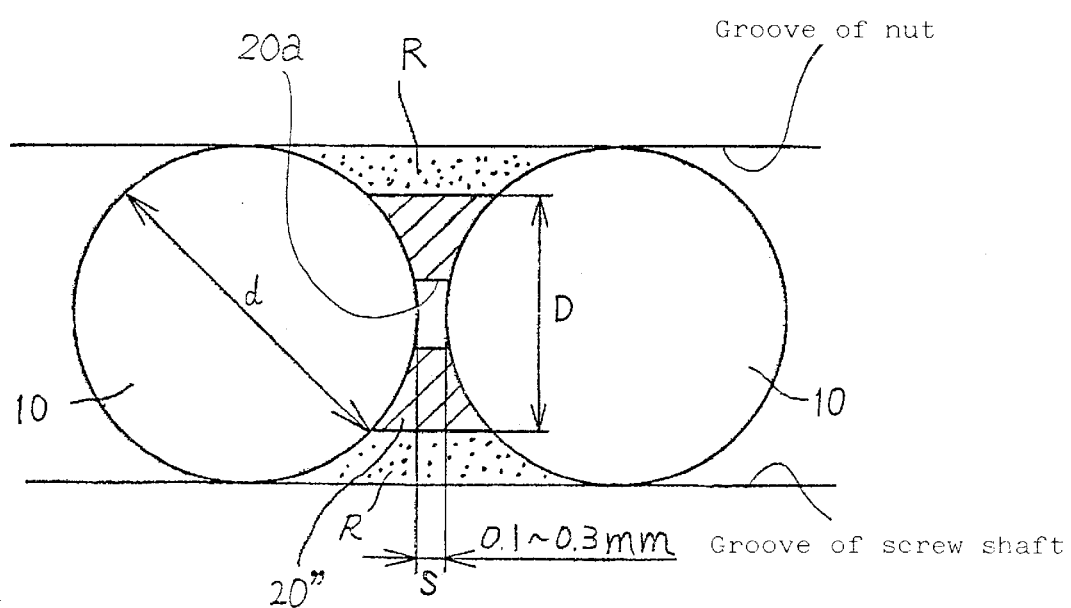
FIG. 3 is a partial axial sectional view of a ball screw employing a spacer according to a third embodiment of the present invention.

FIG. 3 shows a partial axial sectional view of a ball screw according to a third embodiment of the present invention, wherein a spacer 20" includes a through hole 20a which extends axially therethrough. The relationship between the diameter D of the spacer 20" and the diameter d of a ball is: D=0.6d to 0.8d.

In this ball screw, a gap between the vertexes of the adjacent balls is maintained at a small value of 0.1 mm to 0.3 mm by the spacers 20" disposed between the balls 10.

For example, if a ball diameter is ¼ inch (6.35 mm) and a predetermined number of the balls to be installed is 120, in order to provide a gap S of 0.1 mm between the vertexes of the adjacent balls, 60 spacers are required, and the total gap amount of the spacers to be decreased for compensation from the entire length is 6 mm. Accordingly, the number of balls which cannot be installed due to the interposing of the spacers is less than one.

A lubricant such as grease or oil is retained on the ball surface, on the outer peripheral surface of the spacer, and in a space R defined by inner walls of a ball circulation passage as well as in an oil pocket (not shown) formed in the concave surface of the spacers 20, 20'. Thus, superior lubricant retention is obtained, and the replenishment of the lubricant is not required for a long time, that is, maintenance is freed.

Meanwhile, it is preferable that the axial length L of the spacer (see FIG. 1(a)) is made as short as possible for the purpose of increasing the loading capacity by installing as many balls as possible in the ball circulation passage and providing smooth movement of the balls through a bending portion of a ball return passage.

For example, when disk-shaped spacers of 5.0 mm in diameter D and 2.7 mm in length L are used for balls of ¼ inch (6.35 mm) in diameter, it has been verified that there is no obstacle for smooth circulation of the balls.

Figure 4:
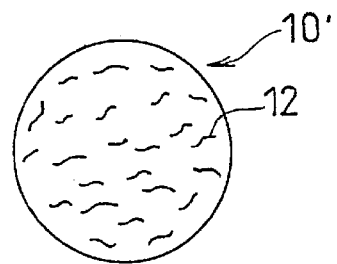
FIG. 4 is an enlarged plan view of a ball for a ball screw according to a further embodiment of the present invention.
Figure 5:
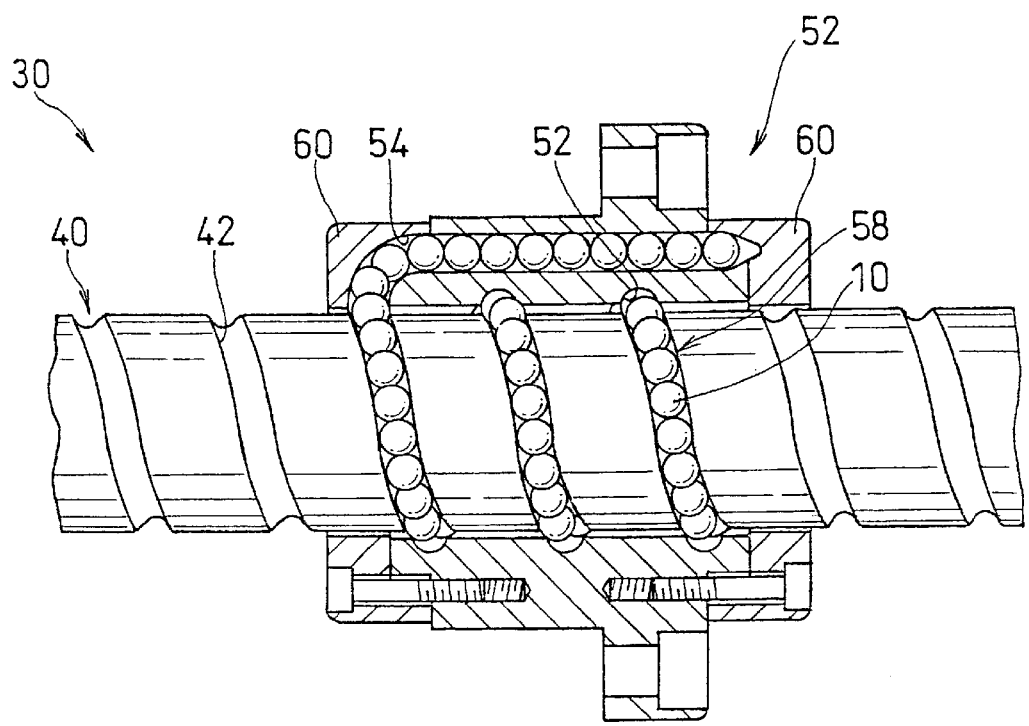
FIG. 5 is an axial sectional view of a conventional end cap type ball screw.

Next, FIG. 4 shows a plan view of a ball 10' used for a ball screw according to a further embodiment of the present invention, wherein a ball 10' has a multitude of fine recesses 12 formed on the surface thereof, and these recesses 12 are adapted to serve as oil pockets of a lubricant. By configuring as mentioned above, the lubricant is allowed to be constantly transferred to the helical groove as the balls 10' rotationally move, and discontinuity of a lubricant film may be prevented. As a result, a longer life ball screw can be obtained.

Then, a method of incorporating balls and spacers into a ball screw in accordance with each embodiment mentioned above is described below.

First, the balls and the spacers are installed into a ball circulation passage in an alternating manner. Finally, if any gap is present, an additional spacer of the length corresponding to the size of the gap is inserted in order to make the gap as small as possible.

For all ball screws of the present invention as described above, if a spacer is made of a plastic containing or impregnated with a lubricant therein, lubrication is automatically carried out by sliding balls in contact with a spherical concave surface of the spacer, and therefore a particular processing to the spherical concave surface of the spacer becomes unnecessary. The term "plastic containing therein or impregnated with a lubricant" means, for example, a material prepared by allowing a substance such as polyethylene, polypropylene, or polybutylene to contain or to be impregnated with a lubricant therein, which is used for the phenomena thereof that oil exudes due to the capillary phenomenon or the thermal expansion of the oil after it is molded. Such a plastic molding technology is well-known from Japanese Patent Publication No. 3455/1972, Japanese Patent Publication No. 25480/1981 or the like. It is not the subject matter of the present invention; and therefore, further descriptions are not given here.

Moreover, supply of a lubricant can be made unnecessary by preparing the spacer with a material such as bronze or grass meatals, 4-ethylene fluoride (Teflon), or graphite which are known as self-lubricalnt materials.

In addition, the spacer is preferably disk-shaped or cylinder-shaped, but not limited thereto.

It should be understood that the present invention may be applied to all types of ball screws such as the return tube type, the circulation piece type, and the guide plate type as well as the end cap type.

Adantages of Invention

As is mentioned above, in accordance with the present invention, contact between balls is avoided, the wear of the balls caused by the friction and the ball clogging are prevented, and noise during servicing is reduced with a relatively simple configuration without using a complex configuration such as a conventional ball chain.

Therefore, the ball screw can operate smoothly with a little variation of the dynamic preload torque even if the screw is used while being preloaded, and resists ball clogging when the ball screw is involved in repetitive operations with minute feeds.

It is also possible to increase the loading capacity of the ball screw by installing more balls in the ball circulation passage by decreasing the axial length of the spacer. In addition that all the balls to be installed are bearing balls, each of the balls can provide a loading capacity which is generally equal to the capacity in the case all the balls are load-bearing balls as listed in catalogs.

If a gap is produced in the ball circulation passage during construction of the ball screw which cannot be accommodated with a spacer of a standard length, another spacer having an axial length corresponding to the size of the gap may be used for reducing the gap.

Furthermore, by providing an oil pocket on the concave surface of the spacer and/or on the ball surface, a lubricant is delivered as the ball rotationally moves, and thereby the friction is reduced.

Further, a lubricant is retained on the outer peripheral surface of the spacer, on the ball surface, and in the space defined by the inner walls of the ball circulation passage as well as in the oil pocket, and thus the replenishment of the lubricant is not necessary for a long time and the maintenance is no longer required.

As a result, thermal expansion or thermal contraction due to heat generation caused by rolling of the balls is suppressed, thereby achieving longer life of the ball screw.

In addition, the same effect can also be obtained by manufacturing the spacer with a self-lubricating material or a plastic impregnated with or containing lubricant therein.

What is claimed is:

1. A ball screw, comprising: a screw shaft including a helical groove on the outer peripheral surface thereof; and a ball nut including on the inner peripheral surface thereof another helical groove opposed to the groove of said screw shaft and including therein a ball return passage consisting of a through hole extending axially; and a plurality of balls which are interposed between the helical groove of said screw shaft and the helical groove of said ball nut and installed within the ball return passage, wherein a spacer having at each end thereof a concave surface complementary to the spherical surface of the ball is disposed at each area between adjacent balls, and the spacers are not interconnected to each other.

2. A ball screw according to claim 1, wherein the spacer includes an oil pocket on the concave surface thereof.

3. A ball screw according to claim 1, wherein the spacer is cylinder-shaped or disk-shaped, and the diameter of the spacer is within the range of 60% to 80% of the diameter of said ball.

4. A ball screw according to claim 1, wherein the vertexes of the adjacent balls are spaced within the range of 0.1 mm to 0.3 mm.

5. A ball screw according to claim 1, wherein said spacer is made of a self-lubricating material or a plastic impregnated with or containing lubricant therein.

6. A ball screw according to claim 1, wherein the ball has a plurality of recesses formed on the surface thereof.

* * * * *